(12) United States Patent
Rose

(10) Patent No.: US 12,138,809 B2
(45) Date of Patent: Nov. 12, 2024

(54) SYSTEMS, DEVICES, AND METHODS FOR DEVELOPING ROBOT AUTONOMY

(71) Applicant: Sanctuary Cognitive Systems Corporation, Vancouver (CA)

(72) Inventor: Geordie Rose, Vancouver (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 283 days.

(21) Appl. No.: 17/719,125

(22) Filed: Apr. 12, 2022

(65) Prior Publication Data
US 2022/0324115 A1 Oct. 13, 2022

Related U.S. Application Data

(60) Provisional application No. 63/173,670, filed on Apr. 12, 2021.

(51) Int. Cl.
*B25J 9/16* (2006.01)
*G05B 19/4155* (2006.01)

(52) U.S. Cl.
CPC ............. *B25J 9/1689* (2013.01); *B25J 9/163* (2013.01); *G05B 19/4155* (2013.01); *G05B 2219/40195* (2013.01); *G05B 2219/50391* (2013.01)

(58) Field of Classification Search
CPC . B25J 9/1689; B25J 9/163; B25J 9/161; B25J 13/08; B25J 19/02; G05B 19/4155; G05B 2219/50391
See application file for complete search history.

(56) References Cited

U.S. PATENT DOCUMENTS

| | | | |
|---|---|---|---|
| 2009/0234499 A1* | 9/2009 | Nielsen | B25J 9/1666 700/250 |
| 2014/0163730 A1* | 6/2014 | Mian | B25J 9/16 700/248 |
| 2020/0174473 A1* | 6/2020 | Moriya | G05D 1/0297 |

FOREIGN PATENT DOCUMENTS

WO WO-2021080729 A1 * 4/2021 ............ B25J 13/082

OTHER PUBLICATIONS

International Search Report, PCT/CA2022/050560, Jul. 11, 2012.

* cited by examiner

*Primary Examiner* — Ian Jen
*Assistant Examiner* — Renee LaRose
(74) *Attorney, Agent, or Firm* — Thomas Mahon

(57) ABSTRACT

In a method of operation of a robot, the robot identifies a set of candidate actions that may be performed by the robot, and collects, for each candidate action of the set of candidate actions, a respective set of ancillary data. The robot transmits a request for instructions to a tele-operation system that is communicatively coupled to the robot. The request for instructions includes each candidate action and each respective set of ancillary data. The robot receives, and executes, the instructions from the tele-operation system. The robot updates a control model, based at least in part on each candidate action, each respective set of ancillary data, and the instructions, to increase a level of autonomy of the robot. The robot may transmit the request for instructions to the tele-operation system in response to determining the robot is unable to select a candidate action to perform in furtherance of an objective.

10 Claims, 6 Drawing Sheets

SYSTEMS, DEVICES, AND METHODS FOR DEVELOPING ROBOT AUTONOMY

TECHNICAL FIELD

The present systems, devices, and methods generally relate to robotics, and particularly relate to training a robot to operate at least semi-autonomously.

BACKGROUND

Robots are machines that can assist humans or substitute for humans. Robots can be used in diverse applications including construction, manufacturing, monitoring, exploration, learning, and entertainment. Robots can be used in dangerous or uninhabitable environments, for example.

Some robots require user input, and can be operated by humans. Other robots have a degree of autonomy, and can operate, in at least some situations, without human intervention. Some autonomous robots are designed to mimic human behavior. Autonomous robots can be particularly useful in applications where robots are needed to work for an extended time without operator intervention, to navigate within their operating environment, and/or to adapt to changing circumstances.

BRIEF SUMMARY

A method of operation of a robot, performed by the robot, may be summarized as comprising identifying a set of candidate actions that may be performed by the robot, collecting, for each candidate action of the set of candidate actions, a respective set of ancillary data transmitting a request for instructions to a tele-operation system, the tele-operation system communicatively coupled to the robot, the request for the instructions which includes each candidate action of the set of candidate actions and each respective set of ancillary data, receiving the instructions from the tele-operation system, executing the instructions, and updating a control model, based at least in part on each candidate action of the set of candidate actions, each respective set of ancillary data, and the instructions, to increase a level of autonomy of the robot.

In some implementations, identifying a set of candidate actions that may be performed by the robot includes identifying a set of candidate actions in response to detecting at least one of an event or a condition. Identifying a set of candidate actions in response to detecting at least one of an event or a condition may include identifying a set of candidate actions in response to detecting at least one of an external event or an external condition. In some implementations, the robot comprises one or more sensors, wherein identifying a set of candidate actions in response to detecting at least one of an external event or an external condition includes sensing, by the one or more sensors, the at least one of an external event or an external condition.

In some implementations, the method further comprises receiving an objective to be completed by the robot, wherein identifying a set of candidate actions that may be performed by the robot includes identifying a set of candidate actions that may be performed by the robot in furtherance of the objective. Receiving an objective to be completed by the robot may include receiving an objective from the tele-operation system. Transmitting a request for instructions to a tele-operation system may include transmitting the request for instructions to the tele-operation system in response to determining the robot is unable to select a candidate action of the set of candidate actions to perform.

In some implementations, transmitting the request for instructions to the tele-operation system in response to determining the robot is unable to select a candidate action of the set of candidate actions to perform includes transmitting the request for instructions to the tele-operation system in response to determining the robot is unable to select a candidate action of the set of candidate actions to perform in furtherance of the objective.

In some implementations, the method further comprises scoring each candidate action of the set of candidate actions, wherein scoring each candidate action of the set of candidate actions includes assigning a respective probability to each candidate action, the respective probability being based at least in part on a respective expectation of progress, achievable by each candidate action, towards the objective. In some implementations, the method further comprises ranking each candidate action in an order of preference, the order of preference being based at least in part on the respective probability of each candidate action. In some implementations, the method further comprises using at least one of the respective probability of each candidate action and the order of preference to determine whether the robot is able to select a candidate action of the set of candidate actions to perform.

In some implementations, transmitting a request for instructions to a tele-operation system includes transmitting a request for instructions includes each respective probability and the order of preference. In some implementations, using at least one of the respective probability of each candidate action and the order of preference to determine whether the robot is able to select a candidate action of the set of candidate actions to perform includes determining whether a respective probability meets a predetermined probability criterion. In some implementations, determining whether a respective probability meets a predetermined probability criterion includes determining whether the respective probability exceeds a predetermined probability threshold. In some implementations, using at least one of the respective probability of each candidate action and the order of preference to determine whether the robot is able to select a candidate action of the set of candidate actions to perform includes determining whether a difference between a first respective probability and a second respective probability meets a predetermined difference criterion.

In some implementations, the robot is a semi-autonomous robot characterized by a level of autonomy, the level of autonomy being determined at least in part by the control model, and the method further comprises comparing the level of autonomy of the robot to a threshold level of autonomy, the threshold level of autonomy above which the robot is operable to autonomously select a candidate action of the set of candidate actions to perform, wherein the transmitting a request for instructions to a tele-operation system includes transmitting the request for instructions to the tele-operation system in response to determining the level of autonomy of the robot is lower than the threshold level of autonomy.

In some implementations, the method further comprises, in response to determining the level of autonomy of the robot meets or exceeds the threshold level of autonomy, performing one of the candidate actions of the set of candidate actions. In some implementations, the method further comprises determining the threshold level of autonomy.

In some implementations, the method further comprises receiving an objective to be completed by the robot, wherein the identifying a set of candidate actions that may be performed by the robot includes identifying a set of candidate actions that may be performed by the robot in furtherance of the objective. Receiving an objective to be completed by the robot may include receiving the objective from the tele-operation system.

In some implementations, the method further comprises determining the threshold level of autonomy, wherein the determining the threshold level of autonomy includes assigning a respective probability to each candidate action, the respective probability being based at least in part on a respective expectation of progress, achievable by each candidate action, towards the objective. In some implementations, the method further comprises ranking each candidate action in an order of preference, the order of preference being based at least in part on the respective probability. Determining the level of autonomy of the robot is lower than the threshold level of autonomy may include determining the respective probability of each candidate action in the set of candidate actions fails to satisfy at least one predetermined criterion.

In some implementations, the robot comprises one or more sensors and a data repository, and collecting, for each candidate action of the set of candidate actions, a respective set of ancillary data includes at least one of collecting a first subset of the respective set of ancillary data by the one or more sensors or extracting a second subset of the respective set of ancillary data from the data repository. Collecting the first subset of the respective set of ancillary data by the one or more sensors may include collecting at least one of audio, imagery, video, or environmental data.

In some implementations, the robot comprises a communications subsystem, and transmitting a request for instructions to a tele-operation system and receiving the instructions from the tele-operation system includes transmitting, by the communications subsystem, a request for the instructions, and receiving, by the communication subsystem, the instructions.

In some implementations, the robot comprises a controller, wherein executing the instructions and updating a control model includes executing, by the controller, the instructions and updating, by the controller, the control model.

Transmitting a request for instructions to a tele-operation system may include transmitting a request for instructions to a piloted tele-operation system. Transmitting a request for instructions to a tele-operation system may include transmitting a request for instructions to a tele-operation system at a remote location relative to the robot. Transmitting a request for instructions to a tele-operation system may include transmitting a request for instructions to a tele-operation system over a data network. The data network may be a wireless data network.

Transmitting a request for instructions to a tele-operation system may include transmitting a request for the tele-operation system to determine which candidate action the robot should perform. Transmitting a request for instructions to a tele-operation system may include entering a standby mode.

Executing the instructions may include invoking at least one of the candidate actions of the set of candidate actions. In some implementations, the robot comprises a motion actuator, and invoking at least one of the candidate actions includes causing, by the motion actuator, the robot to execute a movement. Executing the instructions may include identifying one or more auxiliary actions that can be performed by the robot.

In some implementations, updating a control model, based at least in part on each candidate action of the set of candidate actions, each respective set of ancillary data, and the instructions includes increasing a level of autonomy of the robot from a first level of autonomy to a second level of autonomy, the second level of autonomy being higher than the first level of autonomy. Updating a control model, based at least in part on each candidate action of the set of candidate actions, each respective set of ancillary data, and the instructions may include updating at least one of control instructions, control data, or control parameters. Updating a control model, based at least in part on each candidate action of the set of candidate actions, each respective set of ancillary data, and the instructions may include updating at least one of configuration settings, control methods, policies, procedures, classifiers, or rules.

A robot may be summarized as comprising a body, a controller comprising at least one processor, at least one physically actuatable component mechanically coupled to the body and communicatively coupled to the controller, at least one sensor communicatively coupled to the controller, the at least one sensor operable to collect data, and at least one non-transitory processor-readable storage medium communicatively coupled to the at least one processor, the at least one non-transitory processor-readable storage medium storing processor-executable instructions and/or data that, when executed by the at least one processor, cause the robot to identify a set of candidate actions that may be performed by the robot, collect, for each candidate action of the set of candidate actions, a respective set of ancillary data, transmit a request for instructions to a tele-operation system, the tele-operation system communicatively coupled to the robot, the request for the instructions which includes each candidate action of the set of candidate actions and each respective set of ancillary data, receive the instructions from the tele-operation system, execute the instructions, and update a control model, based at least in part on each candidate action of the set of candidate actions, each respective set of ancillary data, and the instructions, to increase a level of autonomy of the robot.

The robot may be a humanoid robot, and the body may have a form of a human body. The at least one physically actuatable component may include a motion actuator. The at least one sensor may be operable to collect at least one of audio, imagery, video, or environmental data.

In some implementations, the at least one non-transitory processor-readable storage medium further stores processor-executable instructions and/or data that, when executed by at least one processor, cause the robot to detect, by the at least one sensor, at least one of an event or a condition, and the processor-executable instructions and/or data that, when executed by the at least one processor, cause the robot to identify a set of candidate actions that may be performed by the robot, further cause the robot to identify a set of candidate actions that may be performed by the robot in response to detecting the at least one of an event or a condition.

In some implementations, the at least one non-transitory processor-readable storage medium further stores processor-executable instructions and/or data that, when executed by at least one processor, cause the robot to receive an objective, received from the tele-operation system, to be completed by the robot, and the processor-executable instructions and/or data that, when executed by the at least one processor, cause the robot to identify a set of candidate actions that may be performed by the robot, further cause the robot to identify a set of candidate actions that may be performed by the robot in furtherance of the objective.

In some implementations, the processor-executable instructions and/or data that, when executed by the at least one processor, cause the robot to transmit a request for instructions to a tele-operation system further cause the robot to transmit the request for instructions to the tele-operation system in response to determining the robot is unable to select a candidate action of the set of candidate actions to perform. In some implementations, the at least one non-transitory processor-readable storage medium further stores processor-executable instructions and/or data that, when executed by at least one processor, cause the robot to score each candidate action of the set of candidate actions by assigning a respective probability to each candidate action, the respective probability being based at least in part on a respective expectation of progress, achievable by each candidate action, towards an objective. In some implementations, the at least one non-transitory processor-readable storage medium further stores processor-executable instructions and/or data that, when executed by at least one processor, cause the robot to rank each candidate action in an order of preference, the order of preference being based at least in part on the respective probability of each candidate action.

In some implementations, the at least one non-transitory processor-readable storage medium further stores processor-executable instructions and/or data that, when executed by at least one processor, cause the robot to use at least one of the respective probability of each candidate action and the order of preference to determine whether the robot is able to select a candidate action of the set of candidate actions to perform. In some implementations, the processor-executable instructions and/or data that, when executed by the at least one processor, cause the robot to use at least one of the respective probability of each candidate action and the order of preference to determine whether the robot is able to select a candidate action of the set of candidate actions to perform, further cause the robot to determine whether a respective probability meets a predetermined probability criterion. The processor-executable instructions and/or data that, when executed by the at least one processor, cause the robot to use at least one of the respective probability of each candidate action and the order of preference to determine whether the robot is able to select a candidate action of the set of candidate actions to perform, may further cause the robot to determine whether a difference between a first respective probability and a second respective probability meets a predetermined difference criterion.

In some implementations, the robot is a semi-autonomous robot characterized by a level of autonomy, the level of autonomy being determined at least in part by the control model, wherein the at least one non-transitory processor-readable storage medium further stores processor-executable instructions and/or data that, when executed by at least one processor, cause the robot to compare the level of autonomy of the robot to a threshold level of autonomy, the threshold level of autonomy above which the robot is operable to autonomously select a candidate action of the set of candidate actions to perform, and the processor-executable instructions and/or data that, when executed by the at least one processor, cause the robot to transmit a request for instructions to a tele-operation system further cause the robot to transmit the request for instructions to the tele-operation system in response to determining the level of autonomy of the robot is lower than the threshold level of autonomy.

In some implementations, the at least one non-transitory processor-readable storage medium further stores processor-executable instructions and/or data that, when executed by at least one processor, cause the robot, in response to determining the level of autonomy of the robot meets or exceeds the threshold level of autonomy, to perform one of the candidate actions of the set of candidate actions.

In some implementations, the at least one non-transitory processor-readable storage medium further stores processor-executable instructions and/or data that, when executed by at least one processor, cause the robot to determine the threshold level of autonomy. The processor-executable instructions and/or data that, when executed by the at least one processor, cause the robot to determine the threshold level of autonomy, may further cause the robot to assign a respective probability to each candidate action, the respective probability being based at least in part on a respective expectation of progress, achievable by each candidate action, towards the objective. The at least one non-transitory processor-readable storage medium further stores processor-executable instructions and/or data that, when executed by at least one processor, may cause the robot to rank each candidate action in an order of preference, the order of preference being based at least in part on the respective probability. The processor-executable instructions and/or data that, when executed by the at least one processor, cause the robot to determine the level of autonomy of the robot is lower than the threshold level of autonomy, may further cause the robot to determine the respective probability of each candidate action in the set of candidate actions fails to satisfy at least one criterion.

In some implementations, the robot further comprises a data repository, wherein the processor-executable instructions and/or data that, when executed by the at least one processor, cause the robot to collect, for each candidate action of the set of candidate actions, a respective set of ancillary data, further cause the robot to collect a first subset of the respective set of ancillary data by the one or more sensors, and/or extract a second subset of the respective set of ancillary data from the data repository.

In some implementations, the robot further comprises a communications subsystem, wherein the processor-executable instructions and/or data that, when executed by the at least one processor, cause the robot to transmit a request for instructions to a tele-operation system, further cause the robot to transmit, by the communications subsystem, a request for the instructions, and receive, by the communication subsystem, the instructions.

The tele-operation system may be a piloted tele-operation system. The tele-operation system may be at a remote location relative to the robot.

In some implementations, the processor-executable instructions and/or data that, when executed by the at least one processor, cause the robot to transmit a request for instructions to a tele-operation system, further cause the robot to transmit a request for instructions to the tele-operation system over a data network.

In some implementations, the processor-executable instructions and/or data that, when executed by the at least one processor, cause the robot to transmit a request for instructions to a tele-operation system, further cause the robot to enter a standby mode.

In some implementations, the processor-executable instructions and/or data that, when executed by the at least one processor, cause the robot to execute the instructions, further cause the robot to invoke at least one of the candidate actions of the set of candidate actions. The at least one physically actuatable component may include a motion actuator, wherein the processor-executable instructions and/or data that, when executed by the at least one processor, cause the robot to invoke at least one of the candidate actions, may further cause the robot to execute, by the motion actuator, a movement.

In some implementations, the processor-executable instructions and/or data that, when executed by the at least one processor, cause the robot to execute the instructions, further cause the robot to identify one or more auxiliary actions that can be performed by the robot.

In some implementations, the processor-executable instructions and/or data that, when executed by the at least one processor, cause the robot to update the control model, further cause the robot to increase a level of autonomy of the robot from a first level of autonomy to a second level of autonomy, the second level of autonomy being higher than the first level of autonomy.

In some implementations, the processor-executable instructions and/or data that, when executed by the at least one processor, cause the robot to update the control model, based at least in part on each candidate action of the set of candidate actions, each respective set of ancillary data, and the instructions, further cause the robot to update at least one of control instructions, control data, or control parameters.

In some implementations, the processor-executable instructions and/or data that, when executed by the at least one processor, cause the robot to update the control model, based at least in part on each candidate action of the set of candidate actions, each respective set of ancillary data, and the instructions, further cause the robot to update at least one of configuration settings, control methods, policies, procedures, classifiers, or rules.

A method of tele-operating a robot, performed by a tele-operation system communicatively coupled to the robot, may be summarized comprising initializing the robot by transmitting an objective to the robot, receiving, from the robot, a request for instructions, the request for instructions comprising a set of candidate actions that may be performed by the robot, and, for each candidate action of the set of candidate actions, a respective set of ancillary data, analyzing each candidate action of the set of candidate actions and each respective set of ancillary data to determine a respective relative likelihood that each candidate action, if performed by the robot, will lead to furtherance of the objective, and transmitting instructions to the robot, based at least part on each respective relative likelihood, to increase a level of autonomy of the robot.

In some implementations, receiving, from the robot, a request for instructions includes receiving, from the robot, a set of candidate actions that may be performed by the robot in furtherance of the objective. In some implementations, receiving, from the robot, a request for instructions includes receiving, from the robot, a request for instructions in response to the robot determining the robot is unable to select a candidate action of the set of candidate actions to perform. Receiving, from the robot, a request for instructions may include receiving a respective score for each candidate action of the set of candidate actions, the respective score which includes a respective probability for each candidate action, the respective probability being based at least in part on an expectation of progress, achievable by each candidate action, towards an objective. Receiving, from the robot, a request for instructions may further include receiving an order of preference, the order of preference being based at least in part on the respective probability of each candidate action. Analyzing each candidate action of the set of candidate actions and each respective set of ancillary data may include analyzing the respective score of each candidate action to determine a respective relative likelihood that each candidate action, if performed by the robot, will lead to furtherance of the objective.

In some implementations, the method may further comprise updating at least one of a machine-learning model or a machine-learning process of the tele-operation system based at least in part on the respective score of each candidate action.

In some implementations, the robot is a semi-autonomous robot characterized by a level of autonomy, the level of autonomy being determined at least in part by the control model. Receiving, from the robot, a request for instructions may include receiving a request for instructions in response to the robot determining the level of autonomy of the robot is lower than a threshold level of autonomy. The threshold level of autonomy is a level of autonomy above which the robot is operable to autonomously select a candidate action of the set of candidate actions to perform.

In some implementations, analyzing each candidate action of the set of candidate actions and each respective set of data to determine a respective relative likelihood that each candidate action, if performed by the robot, will lead to furtherance of the objective includes analyzing by a pilot each of at least a subset of the set of candidate actions and each respective set of ancillary data to determine a respective relative likelihood that each candidate action, if performed by the robot, will lead to furtherance of the objective.

In some implementations, transmitting instructions to the robot, based at least part on each respective relative likelihood, to increase a level of autonomy of the robot includes transmitting instructions to the robot to cause the robot to update a control model. Transmitting instructions to the robot to cause the robot to update a control model may include transmitting instructions to the robot to cause the robot to update at least one of control instructions, control data, or control parameters.

BRIEF DESCRIPTION OF THE SEVERAL VIEWS OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

DETAILED DESCRIPTION

Figure 1:
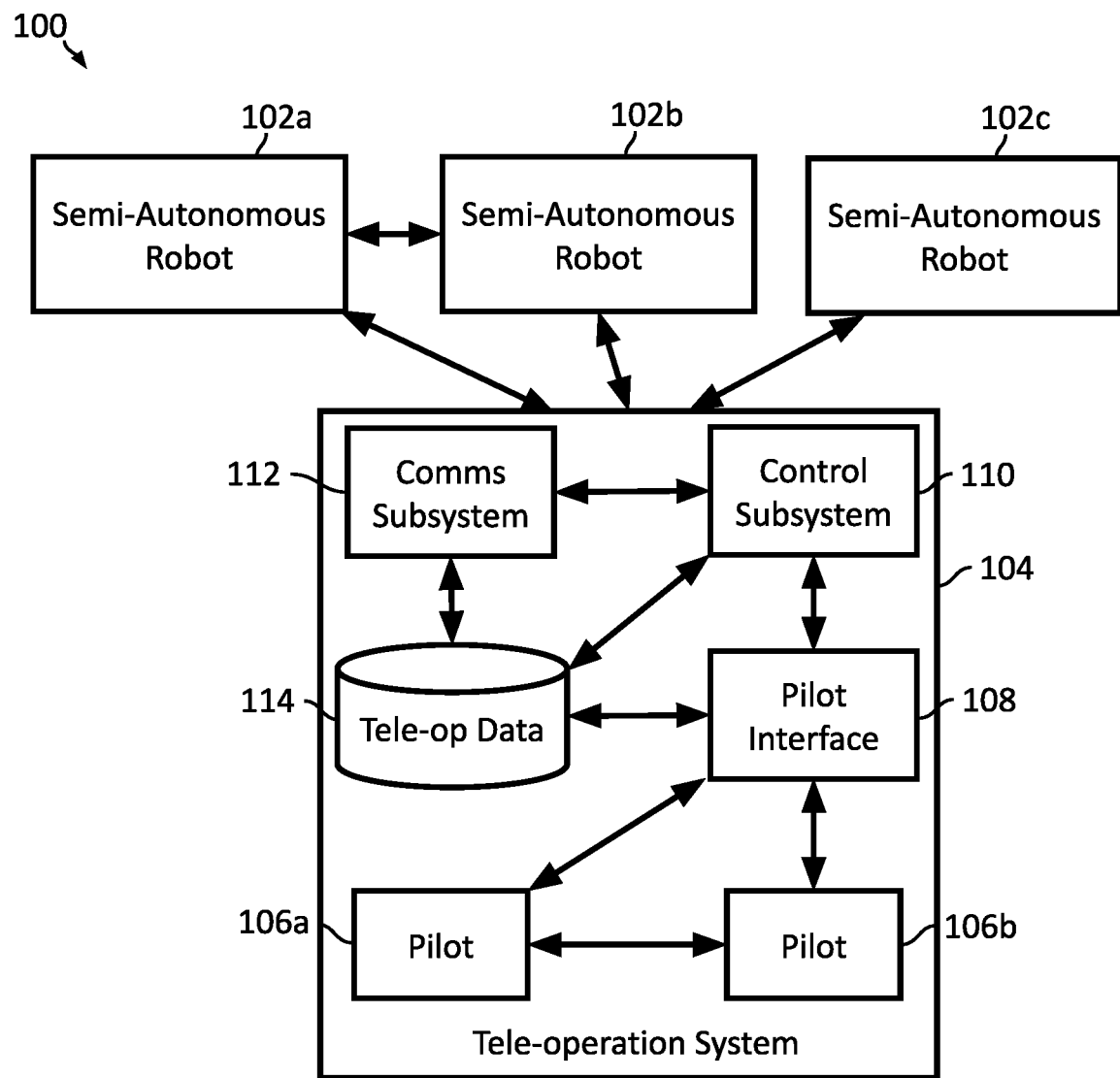
FIG. 1 is a block diagram of a system for improving a level of autonomy of a tele-operated semi-autonomous robot, in accordance with the present systems, devices, and methods.

The following description sets forth specific details in order to illustrate and provide an understanding of various implementations and embodiments of the present systems, devices, and methods. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present systems, devices, and methods.

The various embodiments described herein provide systems, devices, and methods for developing robot autonomy. Developing robot autonomy can include introducing autonomy into operation of the robot. Developing robot autonomy can include increasing a level of autonomy of a semi-autonomous robot.

In the present application, an automated system refers to a system operable to perform a set of specific tasks with well-understood parameters known in advance. An automated system is generally built to perform one or more specific functions repeatedly and in an efficient manner. Typically, automated functions can be performed with little or no intervention from a human operator or a secondary system. Decisions made by an automated system can be based on predefined heuristics, for example.

In the present application, an autonomous system refers to a system capable of analyzing its environment, and determining a preferred course of action, sometimes in a changing, potentially uncertain environment. An autonomous system can be at least partially self-governing, intelligent, sentient, and/or self-aware. A semi-autonomous system refers, in the present application, to a system that may or may not be able to determine a preferred course of action on at least some occasions and/or in response to at least some events or conditions, depending on the specific events or conditions.

A robot may be automated, semi-autonomous, or fully autonomous. In practice, an autonomous or semi-autonomous system typically has a degree of automation i.e., is able to perform certain functions without intervention.

A humanoid robot is a robot with attributes of a human. The attributes may be physical attributes such as body shape and/or behavioral attributes such as empathy. Automated functions of a humanoid robot may include the use and control of limbs, for example.

In the present application, autonomy of a robot refers to its capacity to make unaided decisions, and its ability to learn and adapt to a dynamic environment. Events and conditions encountered by a robot may be outside the bounds of what was anticipated when the robot was initially deployed. Events and conditions may constitute decision points for the robot.

A level of autonomy of a robot refers, in the present application, to a degree of independence of the robot in the way it acts and behaves in response to events and conditions. A level of autonomy may be expressed on an ordinal scale, for example, a scale of 1 to 6, or A to F. A semi-autonomous robot refers in the present application to a robot that is able to act and behave in response to at least some events and conditions without needing to be directed by another system, or human operator, in real-time. The level of autonomy can at least partially dictate the robot's ability to make a decision when it reaches a decision point, when there is uncertainty about how it should proceed. A fully-autonomous robot refers, in the present disclosure, to a robot that acts and behaves without depending on a user or operator to make decisions and take actions.

A semi-autonomous robot may be a tele-operated semi-autonomous robot. In the present application, a tele-operated semi-autonomous robot is a semi-autonomous robot that is communicatively coupled to a tele-operation system. The tele-operation system may be operable by one or more pilots. A pilot can be a human operator, for example. The tele-operation system can be remote from the robot. The pilot(s) can be remote from the robot and/or the tele-operation system.

It can be desirable for a semi-autonomous robot to become more autonomous as it is exposed to various events and conditions. Improving the level of autonomy of a robot can include a) enabling a robot to make more decisions on its own, and take action with less direction from an external entity such as a tele-operation system or an operator, b) enabling a robot to make better decisions on its own and take better actions without direction (e.g., decisions and actions that provide greater advancement towards an objective), and/or c) in a tele-operated robot system, reducing the amount of time and resources devoted to the robot by the tele-operation system. In a tele-operated robot system, improving the level of autonomy of a robot can increase a capacity of a remote pilot to control more robots simultaneously. Improving the level of autonomy of a robot can eventually enable the robot to become fully-autonomous. Improving the level of autonomy of a robot can increase its applicability to different tasks and environments, and can extend its useful life.

There are many examples of semi-autonomous robots. One example of a semi-autonomous robot is a robot responsible for loading trucks with items from a warehouse. In this example, in response to receiving a bill of lading, the robot locates items in the warehouse and loads them on the truck. In furtherance of its objective, the robot may encounter situations where it is uncertain how to proceed. For example, the robot may be uncertain how or where to grab an item in order to pick it up, in what sequence the items should be collected, or where it should be placed in the truck. In response to a particular situation, the robot may be able to identify various actions it can take, yet have insufficient autonomy to proceed without intervention by a human operator or a secondary system such as a tele-operation system.

The systems, devices, and methods of the present application can increase a level of autonomy of the robot such that its operation requires less intervention from the tele-operation system, for example. When the robot reaches a decision point, and is uncertain how to proceed, it can send a request for assistance to the tele-operation system. The request can include a set of candidate actions (also referred to in the present application as options) and associated data (for example, a photograph of the item to be loaded into the truck).

The tele-operation system, and/or a pilot, may review the candidate action and the associated data, decide on a course of action, and send instructions about how to proceed to the robot. For the example of an item being too heavy for the robot to load into the truck, the tele-operation system may instruct the robot to delete the item from the bill of lading and move to the next item. In addition to executing the course of action provided by the tele-operation system, the robot can also learn from the experience, and be able, or more likely, to autonomously decide upon an appropriate course of action in similar situations in the future.

FIG. 1 is a block diagram of an exemplary implementation of a system 100 for improving a level of autonomy of a tele-operated semi-autonomous robot, in accordance with the present systems, devices, and methods. System 100 includes three semi-autonomous robots 102a, 102b, and 102c (collectively referred to as semi-autonomous robots 102) though those of skill in the art will appreciate that in alternative implementations system 100 may include fewer than three, or more than three, semi-autonomous robots. Semi-autonomous robots 102 may be members of a fleet of robots.

In the exemplary implementation of FIG. 1, semi-autonomous robot 102a is communicatively coupled to semi-autonomous robot 102b. Semi-autonomous robots 102a and 102b may have peer-to-peer communications via at least one of a wired and/or a wireless connection, and/or via a network. Semi-autonomous robots 102 may operate independently of one another, or cooperatively with one another. Peer-to-peer communications between semi-autonomous robots 102 may facilitate cooperation between semi-autonomous robots 102. Respective ones of semi-autonomous robots 102 may have different respective levels of autonomy.

System 100 includes a tele-operation system 104 communicatively coupled to semi-autonomous robots 102. Tele-operation system 104 may be communicatively coupled to various ones of semi-autonomous robots 102 by at least one of a wired and/or a wireless connection. Semi-autonomous robots 102 may be tethered, i.e., attached by a tether to tele-operation system 104. Tele-operation system 104 may be communicatively coupled to various ones of semi-autonomous robots 102 via a network.

Various ones of semi-autonomous robots 102 may be located remotely from tele-operation system 104. For example, tele-operation system 104 may be located in an operation center, and various ones of semi-autonomous robots 102 may be deployed away from the operation center. Various ones of semi-autonomous robots 102 may be deployed in a hazardous environment, for example in an environment unsuitable for a tele-operation system or a human operator.

Tele-operation system 104 may be operable by two pilots 106a and 106b (collectively referred to as pilots 106). Those of skill in the art will appreciate that in alternative implementations tele-operation system 104 may be operable by fewer than two, or more than two, pilots. In the exemplary implementation of FIG. 1, pilot 106a is communicatively coupled to pilot 106b. Pilots 106 may be human operators.

In some implementations, tele-operation system 104 is at a single location. In other implementations, tele-operation 104 is a distributed system. For example, pilot 106a and/or pilot 106b may be located remotely from each other and/or from other components of tele-operation system 104. Distributed components of tele-operation 104 may be communicatively coupled to one another by a wired and/or wireless connection, and, in some implementations, via a network. Pilots 106 are communicatively coupled to a pilot interface 108 of tele-operation system 104. Pilot interface 108 may include a display interface and/or audio speakers. Pilot interface 108 may include an interface for data entry, for example a keyboard, a mouse, a handheld controller, a microphone, and/or various sensors (e.g., accelerometers, inertial measurement units, and the like) worn or otherwise actuatable by a pilot 106. Pilot interface 108 may include an application programming interface (API).

Tele-operation system 104 includes a control subsystem 110. Control subsystem 110 may include one or more processors, for example one or more microprocessors, central processor units (CPUs), graphics processor units (GPUs), application specific integrated circuits (ASICs), programmable gate arrays (PGAs), or programmable logic controllers (PLCs), which execute logic, for instance in the form of instructions stored as software or firmware instructions in one or more non-transitory computer- or processor-readable media such as memory (e.g., nonvolatile memory, volatile memory, read only memory, random access memory, flash memory, spinning magnetic or optical media).

Tele-operation system 104 includes a communications (comms) subsystem 112. Communications subsystem 112 may include a receiver, for example to receive requests for instructions from semi-autonomous robots 102, and a transmitter, for example to send instructions to semi-autonomous robots 102.

Tele-operation system 104 also includes a data repository 114. Data repository 114 may include a database and/or one or more files, for example. Data repository 114 may include a memory and/or a storage medium. In some implementations, data repository 114 is co-located with pilot interface 108, control subsystem 110, and communications subsystem 112. In other implementations, at least part of data repository 114 is located remotely from pilot interface 108, control subsystem 110, and/or communications subsystem 112.

Data repository 114 includes tele-operation (tele-op) data. Tele-op data may include control instructions, control data, control parameters, configuration settings, control methods, policies, procedures, classifiers, and/or rules associated with operation of semi-autonomous robots 102. Tele-op data may include current data, for example current locations, current objectives, actions in progress, and/or current levels of autonomy of semi-autonomous robots 102. Tele-op data may include historical data describing, for example, previous requests received by tele-operation system 104 from semi-autonomous robots 102, instructions provided to semi-autonomous robots 102 by tele-operation system 104, and previous actions taken by semi-autonomous robots 102 in furtherance of their respective objectives.

In some implementations, tele-operation system 104 is fully autonomous, and operates with no intervention from pilots 106. In implementations where tele-operation system 104 is able to operate with no intervention from pilots 106, pilots 106 may still be able to monitor semi-autonomous robots 102 through tele-operation system 104, and take control of semi-autonomous robots 102 if needed or desired.

Semi-autonomous robots 102 may be remotely controlled by tele-operation system 104, e.g., by pilots 106 of tele-operation system 104. As mentioned previously, semi-autonomous robots 102 may have different levels of autonomy. For example, semi-autonomous robot 102a may have a higher level of autonomy than semi-autonomous robot 102b. Operation of semi-autonomous robot 102a may require less intervention by tele-operation system 104 than operation of semi-autonomous robot 102b.

Operation of each of semi-autonomous robots 102 can include furtherance of a respective objective. In some implementations, the respective objective is set by or through tele-operation system 104, for example. In other implementations, the objective of at least one of the semi-autonomous robots is set by the semi-autonomous robot itself, i.e., the robot is sufficiently autonomous to set its own objective. In yet other implementations, the objective of a robot is set by another semi-autonomous robot, either directly via peer-to-peer communication (see, e.g., semi-autonomous robots 102a and 102b), or indirectly via tele-operation system 104.

Figure 2:
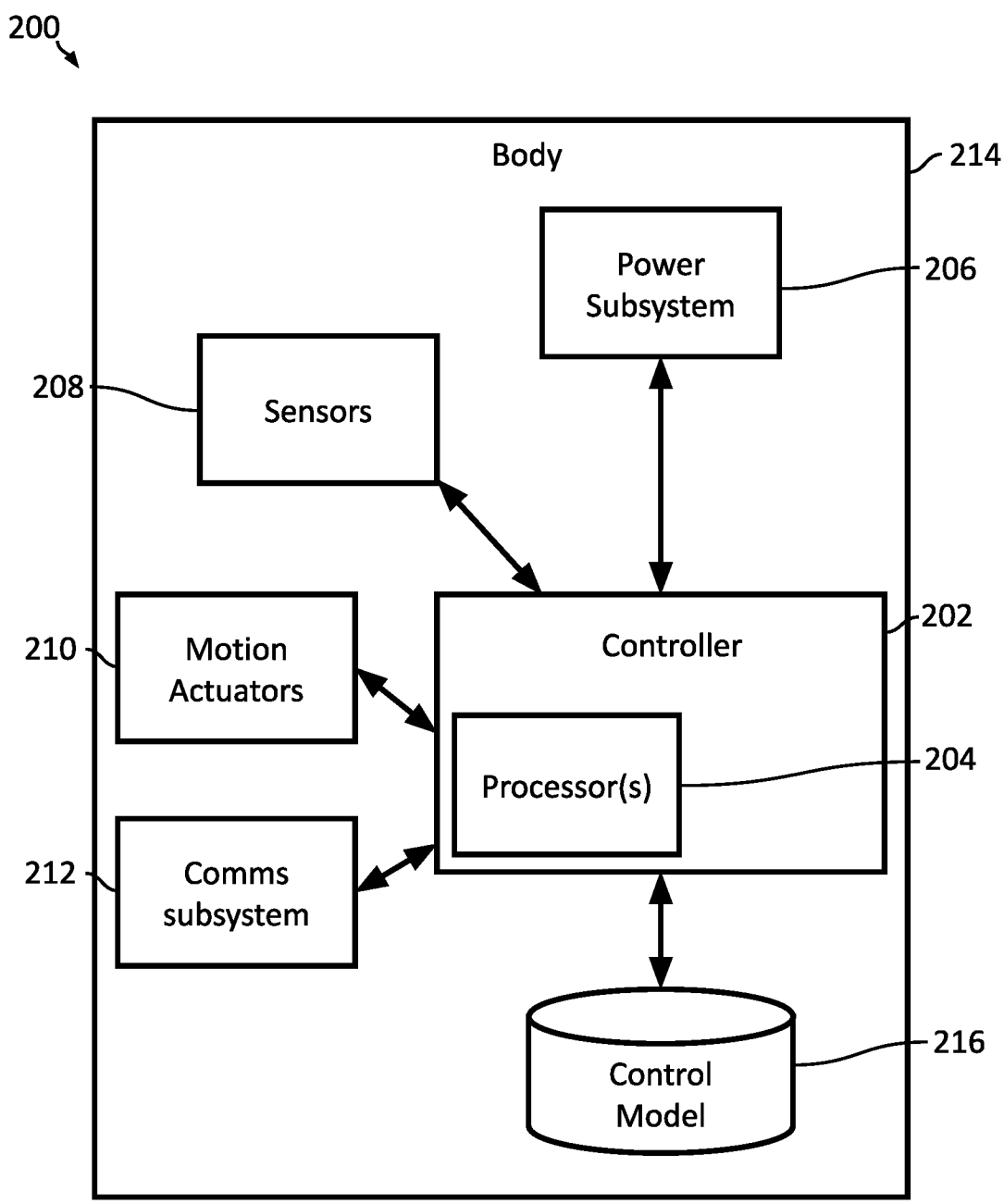
FIG. 2 is a block diagram of a tele-operated semi-autonomous robot, in accordance with the present systems, devices, and methods.

FIG. 2 is a block diagram of an exemplary implementation of a tele-operated semi-autonomous robot 200, in accordance with the present systems, devices, and methods. Semi-autonomous robot 200 includes controller 202, processor(s) 204, power subsystem 206, sensors 208, motion actuators 210, and communications (comms) subsystem 212, housed in a body 214. Body 214 may have a shape, form factor, and/or number of components suitable for construction and/or operation of semi-autonomous robot 200. In some implementations, semi-autonomous robot 200 is a humanoid robot, and body 214 may be built to resemble a human body, for example. Body 214 may have a form of a human body.

Controller 202 may control actions of semi-autonomous robot 200. Controller 202 may execute instructions provided by a tele-operation system in order to cause robot 200 to take action.

Controller 202 may identify candidate actions of or for semi-autonomous robot 200. Candidate actions are actions regarded by controller 202 as suitable actions, and may include actions that may at least partially fulfill an objective, for example. Controller 202 may identify candidate actions while executing instructions and/or while acting to at least partially fulfill an objective. Controller 202 may initiate identifying candidate actions. Controller 202 may identify candidate actions in response to events and/or conditions. The events and/or conditions may be internal events and/or conditions, for example, a low battery level in power subsystem 206. The events and/or conditions may be external events and/or conditions, i.e., events and/or conditions external to semi-autonomous robot 200, for example, proximity of another robot, or an ambient temperature that exceeds a predetermined temperature threshold, or a presence or absence of a particular object in the robot's external environment.

After identifying candidate actions, controller 202 may determine whether semi-autonomous robot 200 is able to decide upon a preferred course of action. The course of action may include one or more of the candidate actions. If semi-autonomous robot 200 is able to decide upon a preferred course of action, then it can proceed to execute one or more of the candidate actions. If semi-autonomous robot 200 is unable to decide upon a preferred course of action, then it can transmit a request for instructions from a tele-operation system (e.g., tele-operation system 104).

In some implementations, semi-autonomous robot 200 evaluates whether it has sufficient confidence, based at least in part on an analysis of the candidate actions, to make a decision on how to proceed. If it has insufficient confidence in the decision, then it can request assistance from the tele-operation system. Assistance may be in the form of instructions from the tele-operation system to semi-autonomous robot 200.

In some implementations, the evaluation of whether semi-autonomous robot 200 has sufficient confidence is based at least in part on a respective probability of each candidate action and/or a ranking of candidate actions (also referred to in the present application as an order of preference). Such probabilities and/or rankings (e.g, such order of preference) may be determined by the semi-autonomous robot 200.

In some implementations, semi-autonomous robot 200 is self-aware of its level of autonomy. For example, semi-autonomous robot 200 may store a control model defining or including a level of autonomy. In some implementations, semi-autonomous robot 200 estimates a current level of autonomy from the control model. In some implementations, the control model includes at least one or more of the following: control instructions, control data, control parameters, configuration settings, control methods, policies, procedures, classifiers, and/or rules.

Processor(s) 204 may include one or more processors, for example one or more microprocessors, central processor units (CPUs), graphics processor units (GPUs), application specific integrated circuits (ASICs), programmable gate arrays (PGAs), or programmable logic controllers (PLCs), which execute logic, for instance in the form of instructions stored as software or firmware instructions in one or more non-transitory computer- or processor-readable media such as memory (e.g., nonvolatile memory, volatile memory, read only memory, random access memory, flash memory, spinning magnetic or optical media).

Power subsystem 206 may include one or more power sources, for example a mains power supply, a battery, a fuel cell, a panel of photovoltaic cells, a generator, and/or an internal combustion engine. Power subsystem 206 may include a hydraulic pressure system.

Sensors 208 may include one or more of the following: light sensors (for example, a CCD [Charge Coupled Device] camera), sound sensors (for example, a microphone), proximity sensors (for example, an ultrasound sensor and/or LIDAR system), tactile sensors (for example, a touch sensor and/or haptic sensor), environment sensors (for example, temperature sensors, wind speed sensors, magnetometers, and/or aerosol sensors), navigation and positioning sensors (for example, GPS [Global Positioning System]), an accelerometer, and diagnostic sensors (for example, battery level sensor).

In operation, semi-autonomous robot 200 may collect data pertaining to the previously identified one or more candidate actions. Data may include sensor data collected by sensors 208. Data may include, without limitation, images, video, audio, wind speed, local magnetic field, ambient temperature, battery level, and/or concentration of aerosols.

Semi-autonomous robot 200 may include at least one physically actuatable component (e.g., motion actuators 210) mechanically coupled to body 214. Motion actuators 210 may include, for example, linear and/or rotary actuators, and the actuators may be, for example, hydraulic, pneumatic, and/or electric. A DC (direct current) electric actuator can include, for example, a DC motor, a DC gear motor, a stepper motor, and/or a linear electric actuator. Depending on the specific design and function of robot 200, motion actuators 201 may drive a range of different types of physically actuatable components, including without limitation: wheels, legs, arms, end effectors, grippers, hands, and/or a head.

Communications subsystem 212 may include a transmitter and a receiver, may use technologies such as Wi-Fi local area networking and/or cellular communications technology (e.g., 4G, LTE, 5G, and the like), and may support one or more protocols, for example, Ethernet or Bluetooth.

Semi-autonomous robot 200 also includes data repository 216. Data repository 216 may store the control model.

Figure 3A:
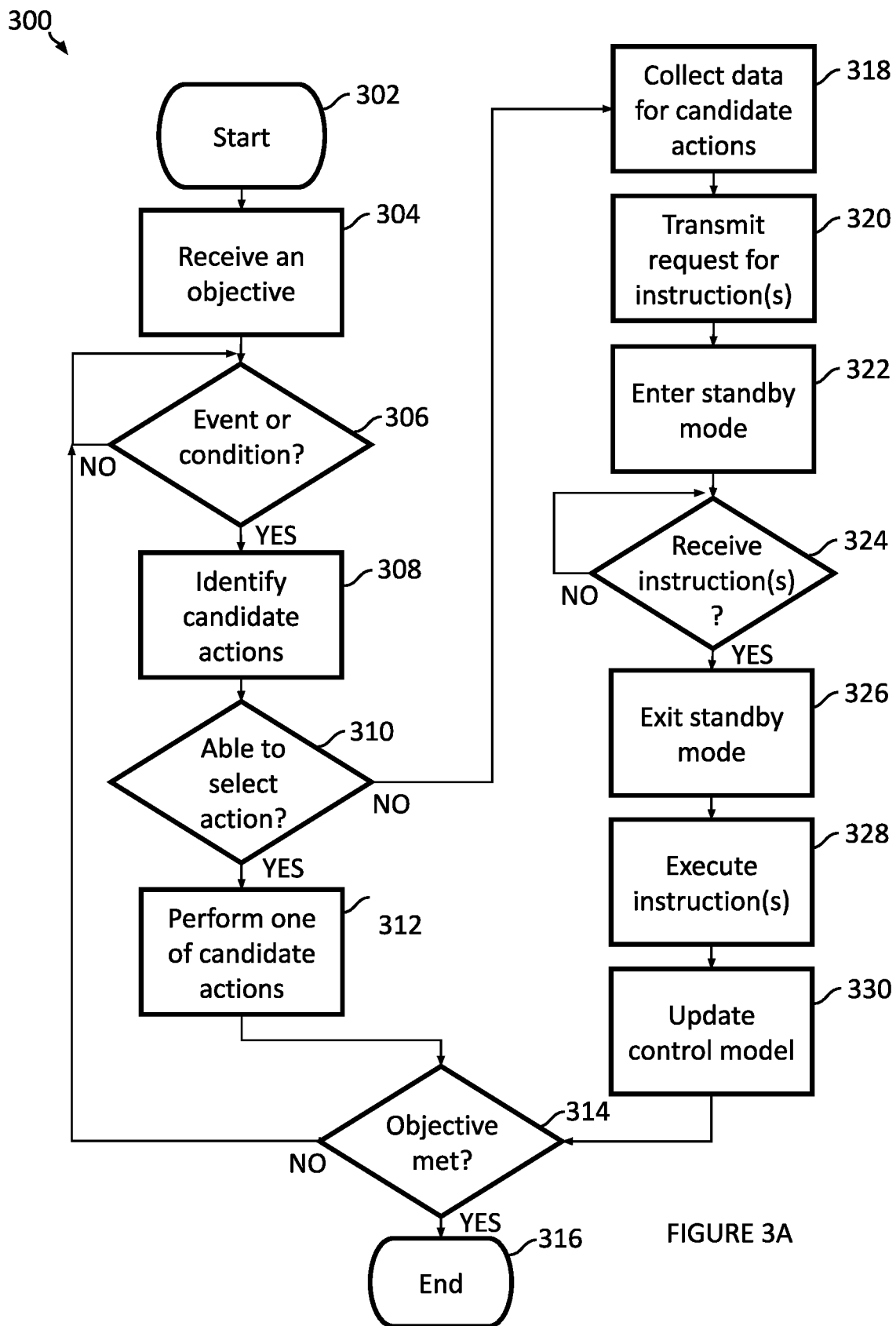
FIG. 3A is a flow diagram of an exemplary method of operation of a tele-operated semi-autonomous robot (for example, the tele-operated semi-autonomous robot of FIG. 2), in accordance with the present systems, devices, and methods.

FIG. 3A is a flow diagram showing an exemplary method 300 for operation of a tele-operated semi-autonomous robot (e.g., semi-autonomous robot 102a of FIG. 1), in accordance with the present systems, devices, and methods. Method 300 of FIG. 3A includes fourteen acts 302, 304, 306, 308, 310, 312, 314, 316, 318, 320, 322, 324, 326, 328, and 330. Those of skill in the art will appreciate that in alternative implementations certain acts of FIG. 3A may be omitted and/or additional acts may be added. Those of skill in the art will also appreciate that the illustrated order of the acts is shown for exemplary purposes only and may change in alternative implementations.

At 302, in response to a starting condition, method 300 starts. The starting condition may include a start-up command (or wake-up command) from a tele-operation system (e.g., tele-operation system 104 of FIG. 1) to the semi-autonomous robot. The starting condition may include the tele-operation system detecting the semi-autonomous robot has exited a standby mode, or an instruction from the tele-operation system to cause the robot to exit a standby mode. The starting condition may be autonomously observed, effected, or triggered by the robot. At 304, the semi-autonomous robot receives an objective, for example, from the tele-operation system.

When an event or condition is met or triggered at 306, the semi-autonomous robot identifies a set of candidate actions at 308 for furtherance of the objective in light of the event or condition. Watching for an event or condition at 306 is optional. In some situations, the robot proactively identifies a set of candidate actions. The set of candidate actions identified at 308 includes one or more candidate actions. One of the candidate actions can be to do nothing and wait for another event or condition to occur. If, at 310, the semi-autonomous robot determines it is able to decide upon a preferred course of action, method 300 proceeds to 312. The preferred course of action can include performing a selected one of the set of candidate actions. An example of a method by which the semi-autonomous robot can determine whether it is able to decide upon a preferred course of action at 310 is described below with reference to FIG. 3B.

At 312, the semi-autonomous robot performs a selected action. If the robot determines, at 314, the objective has been met, then method 300 proceeds to 316, where it ends. If the robot determines, at 314, the objective has not yet been met, method 300 returns to 306, where the robot waits for, or seeks or pursues, another event or condition.

If, at 310, the robot determines it has insufficient autonomy to decide upon a preferred course of action, method 300 proceeds to 318, where it collects (e.g., using sensors 208) respective data pertaining to each of the candidate actions identified in 308. At 320, the robot transmits a request for instructions to the tele-operation system, and enters a standby mode at 322. In standby mode, the robot may pause operations, and may power down, for example. The request for instructions transmitted by the robot at 320 may include the candidate actions identified by the robot at 308 and the corresponding data for the candidate actions collected by the robot at 318.

At 324, the robot waits for instructions to be received from the tele-operation system. At 326, when instructions have been received from the tele-operation system, the robot exits standby mode. At 328, the robot executes the received instructions. At 330, the robot updates a control model in a data repository (e.g, 216) of the robot, and method 300 proceeds to 314. Updating the control model in the data repository may include updating control instructions, control data, control parameters, configuration settings, control methods, policies, procedures, classifiers, and/or rules that govern at least in part the robot's ability to operate autonomously. Updating the control model in the data repository may include updating a level of autonomy of the robot to a higher level of autonomy.

If the robot determines, at 314, the objective has been met, then method 300 proceeds to 316, where it ends. If the robot determines, at 314, the objective has not yet been met, method 300 returns to 306, where the robot waits for, or seeks or pursues, another event or condition.

Figure 3B:
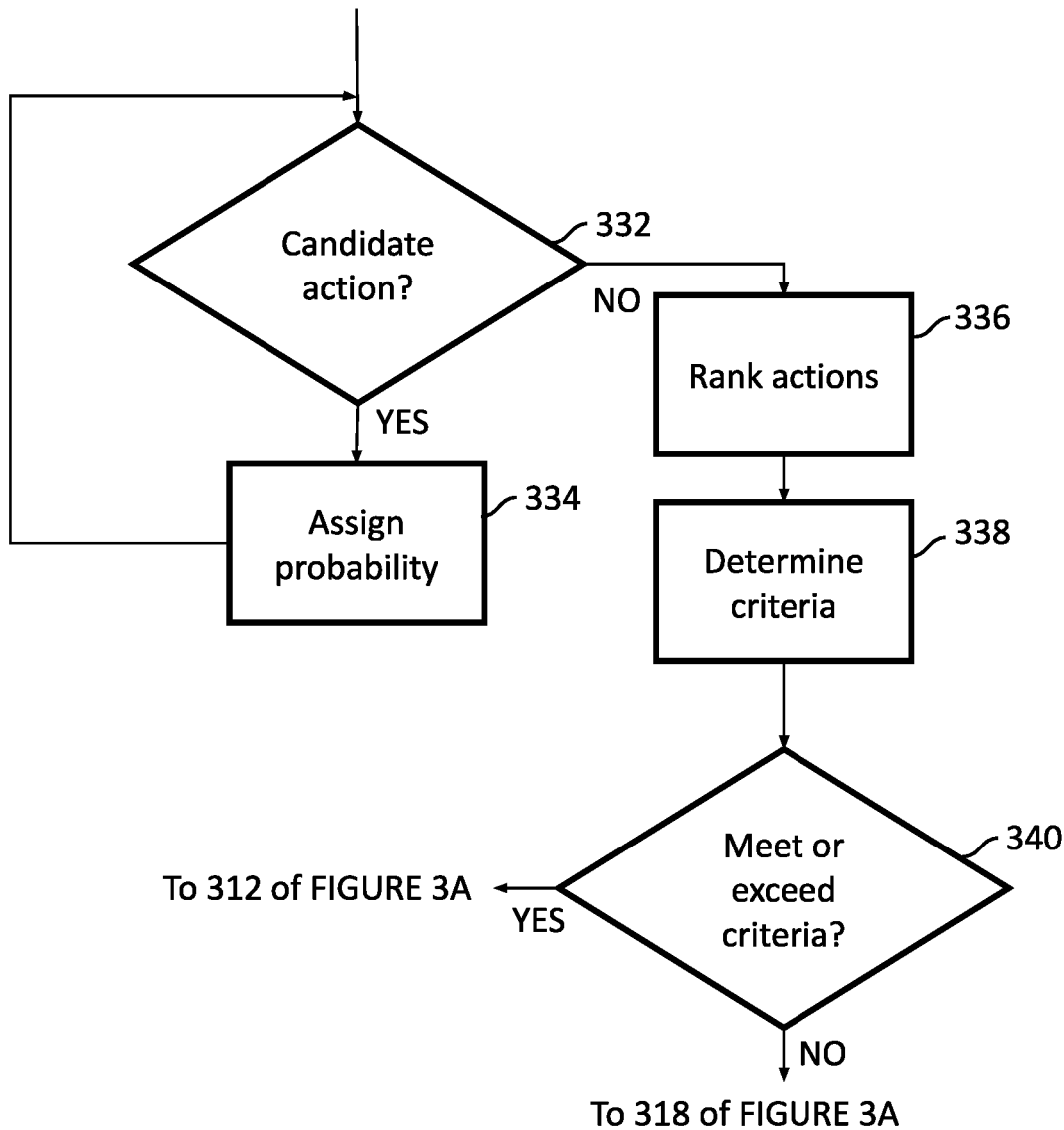
FIG. 3B is a flow diagram of an exemplary method of determining whether a tele-operated semi-autonomous robot (for example, the tele-operated semi-autonomous robot of FIG. 2) is able to select a preferred course of action, in accordance with the present systems, devices, and methods.

FIG. 3B is an expanded view of an exemplary implementation of act 310 of method 300 from FIG. 3A. Act 310 of FIG. 3A is expanded in FIG. 3B, and itself includes six acts 332, 334, 336, 338, and 340. Those of skill in the art will appreciate that in alternative implementations certain acts of FIG. 3B may be omitted and/or additional acts may be added. Those of skill in the art will also appreciate that the illustrated order of the acts is shown for exemplary purposes only and may change in alternative implementations.

After identifying candidate actions at 308 of FIG. 3A, method 300 proceeds to 332 of FIG. 3B. Until the semi-autonomous robot exhausts the list of candidate actions at 332, the semi-autonomous robot assigns each candidate action a respective probability at 334.

At 336, the robot ranks each of the candidate actions based at least in part on the respective probability assigned at 334. At 338, the robot determines criteria based at least in part on the probabilities assigned at 334 and/or the ranking produced at 336. In some implementations, the criteria include a threshold level of autonomy. The threshold level of autonomy is a level of autonomy above which the robot is operable to autonomously select a candidate action of the set of candidate actions to perform.

The respective probability assigned at 334 to each action can be based at least in part on a respective probability each action will cause progress towards the robot's objective and/or an anticipated extent of progress. Determining a threshold level of autonomy may include, for example, identifying one of the respective probabilities exceeds a predetermined probability threshold, or that a difference between the respective probabilities of the most probable and the second most probable actions exceeds a predetermined difference threshold. Other suitable criteria, and combination of criteria, may be used to determine the threshold level of autonomy. These criteria may depend at least in part on the respective probabilities and rankings of the candidate actions.

At 340, if the criteria for making a decision by the robot are not met (for example, if the level of autonomy of the robot is lower than the threshold level of autonomy), method 300 proceeds to 318 of FIG. 3A. If the criteria are at least met (for example, if the level of autonomy of the robot meets or exceeds the threshold level of autonomy), method 300 proceeds to 312 of FIG. 3A.

In some implementations, the semi-autonomous robot includes one or more processors (for example, processor(s) 204 of the semi-autonomous robot 200 of FIG. 2), and control of various of acts 302 to 340 of FIGS. 3A and 3B is performed by the processor(s). In some implementations, the semi-autonomous robot includes a communications subsystem (for example, communication subsystem 212 of FIG. 2), and acts 320 (transmit request for instructions) and 324 (receive instructions) are performed by the communications subsystem.

Figure 4:
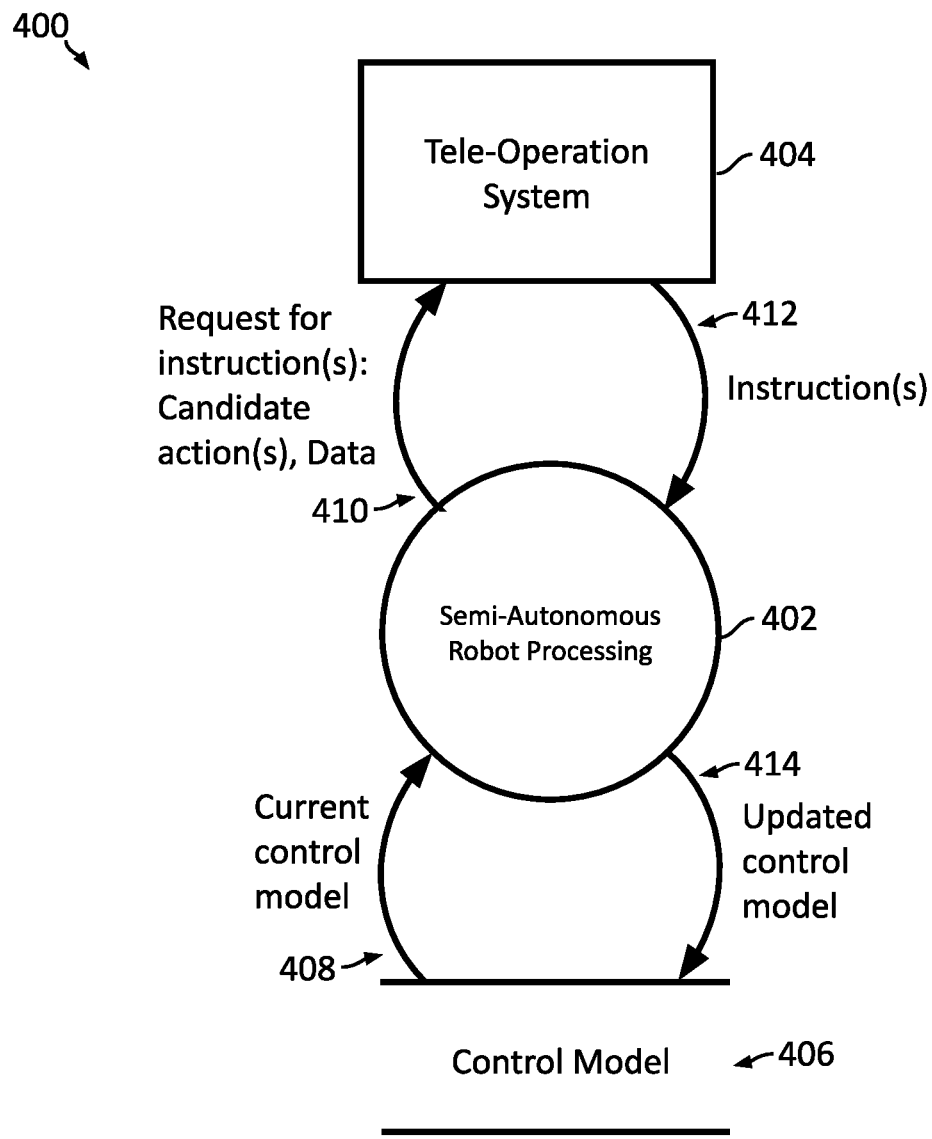
FIG. 4 is a data flow diagram of an exemplary implementation of a system for developing autonomy of a tele-operated semi-autonomous robot (for example, the tele-operated semi-autonomous robot of FIG. 2), in accordance with the present systems, devices, and methods.

FIG. 4 is a data flow diagram (DFD) 400 of an exemplary implementation of a system for developing autonomy of a tele-operated semi-autonomous robot (for example, one of semi-autonomous robots 102 of FIG. 1), in accordance with the present systems, devices, and methods.

DFD 400 includes semi-autonomous robot processing 402, a tele-operation system 404, and control model 406. Semi-autonomous robot processing 402 is a process able to transform incoming data to output data for control and/or operation of a semi-autonomous robot (for example, semi-autonomous robot 200 of FIG. 2). Semi-autonomous robot processing 402 may be performed by at least one processor (e.g., 204) accessing and/or executing a control model 406 stored in a non-transitory processor-readable storage medium, or data repository (e.g., 216) communicatively coupled to the at least one processor. From a perspective of semi-autonomous robot processing 402, tele-operation system 404 is an external entity, and is an external source/sink of data. Control model 406 is a data repository, for example a database or a file.

DFD 400 includes four data flows: current control model 408, a request for instruction(s) 410, instruction(s) 412, and updated control model 414.

Current control model 408 may include, for example, a current level of autonomy, a threshold level of autonomy, actions and respective data for each action, as well as other models, classifiers, rules, algorithms, policies, and so on that govern the (semi-)autonomous control of the robot.

Request for instruction(s) 410 may include a list of candidate actions and respective data for each candidate action. In some implementations, request for instruction(s) 410 includes a full list of candidate actions identified by the robot. In other implementations, request for instruction(s) 410 includes a partial list of candidate actions. The partial list may be determined by the robot by filtering the full list of candidate actions and including in the partial list the candidate actions that meet one or more criteria, such as only the top X candidate actions according to a ranking scheme employed by the robot, where X may be any number greater than 1, such as 2, 3, 4, 5, and so on.

Instruction(s) 412 may include, for example, a proposed course of action. The proposed course of action may be or include a selection of one or more of the candidate actions identified by the robot. Additionally, or alternatively, instruction(s) 412 may include a request for the robot to identify additional candidate actions (also referred to in the present application as auxiliary actions) and/or a request for the robot to collect additional data about one or more candidate action(s). Instruction(s) 412 may include an action not previously included in the candidate actions. For example, instruction(s) 412 may include an instruction to return to a base location or to enter a sleep mode.

Updated control model 414 may include, for example, updating any or all of: a classifier (e.g., by adjusting at least one weighting in the classifier), a model, a policy, an algorithm, a rule, and/or a parameter, such as a current level of autonomy. The updated level of autonomy may be a higher level of autonomy. The level of autonomy may be expressed on an ordinal scale, for example, 1 to 6, or A to F. The robot may advance to a new level of autonomy after receiving instruction(s) from the tele-operation system. The level of autonomy may be assessed and updated based on performance of the robot, for example, a successful execution of instructions, measurement of a benchmark, or an achievement of an objective.

Updating control model 414 can include a) identifying instruction(s) 412 as a preferred course of action in the given scenario (i.e., in response to the event and/or condition that triggered the request for instructions and given the data collected by the robot in relation to the selected candidate action), and/or b) assigning a weight to the action(s) in the instruction(s) to be used in future when assessing candidate actions in response to an event or condition.

As a more detailed example, for illustrative purposes only, the robot may send a request for instructions 410 as an implementation of act 320 of method 300. The request for instructions 410 may include: i) a set of candidate actions identified by the robot per act 308 of method 300, and ii) corresponding data collected by the robot for each candidate action per act 318 of method 300. The tele-operation system 404 may receive the request for instructions 410 and generate instructions 412 in accordance with method 500 illustrated in FIG. 5 (described later on). Instructions 412 may include, among other things, a selection of a particular one of the candidate actions provided by the robot in request for instructions 410. The robot may receive instructions 412 per act 324 of method 300 and execute instructions 412 per act 328 of method 300. For example, at 328 of method 300 the robot may execute or perform the particular candidate action selected in instructions 412.

In the foregoing example, the robot's control model 406 causes the robot to send request for instructions 410 as an implementation of act 320 of method 300 because the robot's control model 406 is not able to (e.g., the robot does not have sufficient autonomy to) decide, per act 310 of method 300, which candidate action (identified at 308) should be pursued. That is, the exemplary robot's control model 406 is architected such that, given the particular combination of work objective, candidate actions, and sensor readings encountered by the robot, control model 406 (and therefore the robot) is not able to autonomously decide what action should be taken in order to fulfill, or best progress towards fulfillment of, the objective. This uncertainty may be due, in part, to the robot (or control model 406) not having encountered this particular combination of work objective, candidate actions, and sensor readings before. In accordance with the present systems, devices, and methods, when the robot receives instructions 412 the robot (or more specifically, the robot's control model 406) learns from instructions 412 and updates (414) control model 406 per act 330 of method 300. The specific details of how control model 406 is updated (e.g., what instructions, variables, parameters, algorithms, etc. are changed and in what ways) depend on the particular implementation of control model 406 and may vary widely in different embodiments of robots and/or robotic systems; however, in general updated control model 414 may replace or supplement control model 406 and include instructions, variables, parameters, algorithms, etc. that are adapted (relative to the original instructions, variables, parameters, algorithms, etc. of control model 406) to cause the robot to, in subsequent situations where the robot encounters the same or similar combination of work objective, candidate actions, and sensor readings, assign a higher ranking (e.g., probability) to the candidate action that was selected in instructions 412 and, for example, enable the robot to autonomously decide, at 310 of method 300, to perform such candidate action without consulting with tele-operation system 404.

Those of skill in the art will appreciate that in alternative implementations certain data flows of DFD 400 may be omitted and/or additional data flows may be added. Those of skill in the art will also appreciate that the triggering and timing of data flows described with reference to DFD 400 of FIG. 4 is for exemplary purposes only and may change in alternative implementations. For example, tele-operation system 404 may provide instruction(s) 412 at a time other than in response to a request for instruction(s) 410 from semi-autonomous robot processing 402.

In some implementations, tele-operation system 404 (or a pilot of the tele-operation system) may learn (i.e., may improve its own level of autonomy, decision-making ability and/or knowledge and understanding) from request for instruction(s) 410. For example, request for instruction(s) 410 may include hitherto unexpected candidate actions and/or rankings of candidate actions identified by the robot. Similarly, in some implementations, when a robot is in communication with tele-operation system 404, other robots may learn from request for instruction(s) 410 transmitted and/or instruction(s) 412 to which they are party. That is, a control model of a second robot may be updated based on an update made to the control model of a first robot.

In some implementations, tele-operation system 404 may send instructions to a second robot which may cause the second robot to update a control model, and may cause the second robot to increase its level of autonomy. In some implementations, request for instruction(s) 410 and instruction(s) 412 may be broadcast, and received by one or more other robots. The other robots may increase their level of autonomy based on the broadcast request and/or the broadcast instructions.

In some implementations, a request for instruction(s) may be transmitted by a first robot (e.g., via peer-to-peer communication) to a second robot. The second robot may have a higher level of autonomy than the first robot. The second robot may send instructions to the first robot.

Figure 5:
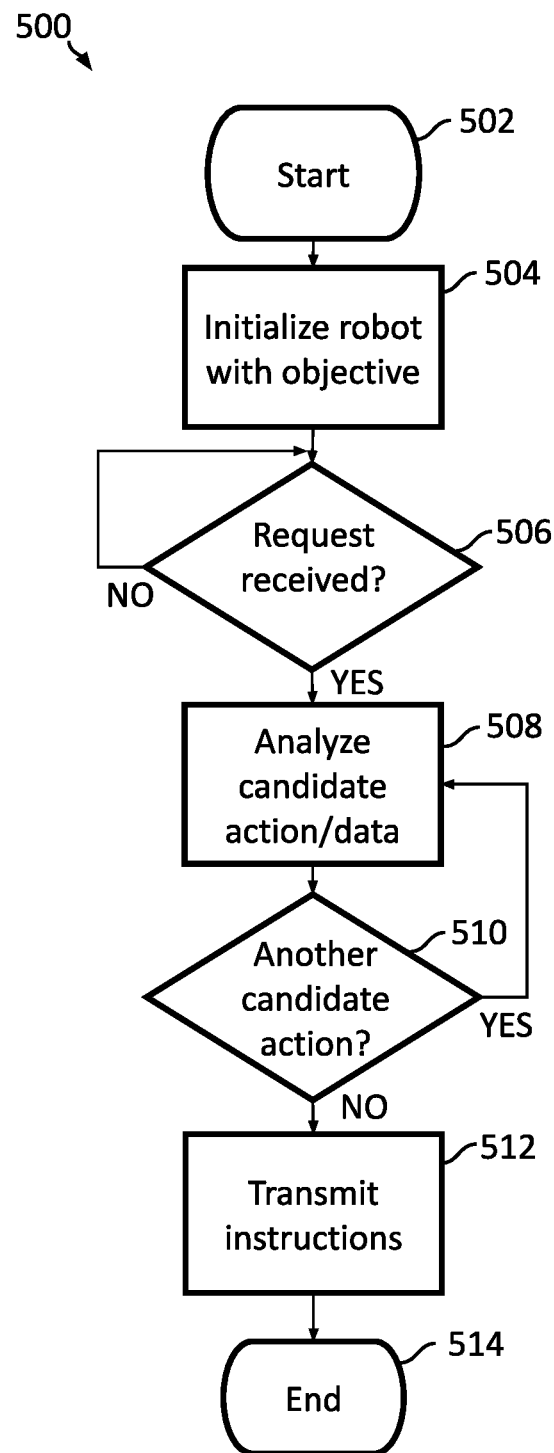
FIG. 5 is a flow diagram of an exemplary method of tele-operating a robot (for example, the tele-operated semi-autonomous robot of FIG. 2), in accordance with the present systems, devices, and methods.

FIG. 5 is a flow diagram of an exemplary method 500 of tele-operating a robot (for example, tele-operated semi-autonomous robot 200 of FIG. 2), in accordance with the present systems, devices, and methods. Method 500 of FIG. 5 includes seven acts 502, 504, 506, 508, 510, 512, and 514. Those of skill in the art will appreciate that in alternative implementations certain acts of FIG. 5 may be omitted and/or additional acts may be added. Those of skill in the art will also appreciate that the illustrated order of the acts is shown for exemplary purposes only and may change in alternative implementations.

At 502, in response to a starting condition, method 500 starts. The starting condition may include a start-up of the tele-operation system (e.g., tele-operation system 104 of FIG. 1), a command from another system, or a command from a pilot of the tele-operation system via a pilot interface, or a signal from the robot, for example.

At 504, the tele-operation system initializes the robot. In some implementations, the tele-operation system initializes the robot by transmitting an objective to the robot. At 506, the tele-operation system waits until it receives a request for instructions from the robot. In some implementations, the tele-operation system can tele-operate multiple robots at the same time. Requests for instructions may be received asynchronously from multiple different robots. The request for instructions received from the robot initialized at 504 can include a set of candidate actions that may be performed by the robot, and, for each candidate action of the set of candidate actions, a respective set of ancillary data.

When a request for instructions from the robot is received by the tele-operation system, the method proceeds to 508, where the tele-operation system analyzes a candidate action and the respective ancillary data from the request. At 510, the tele-operation system determines if there is another candidate action to analyze. If so, method 500 returns to 508. Otherwise, method 500 proceeds to 512.

Analyzing the request can include analyzing at least a subset of the set of candidate actions and at least a subset of data of each respective set of ancillary data. The ancillary data can include sensor data, for example. The ancillary data can include scores determined by the robot. The scores may indicate an expected progress achievable by a candidate action, if performed by the robot, in furtherance of the objective. The scores may include one or more probabilities, probability differences, and/or an order of preference (also referred to in the present application as a ranking). Scores received by the tele-operation system from the robot may assist the tele-operation system's analysis. The scores may also be used to train, or otherwise provide input to, machine-learning models or processes of the tele-operation system. Analyzing the request can include determining a respective relative likelihood that each candidate action, if performed by the robot, will lead to furtherance of the objective.

Analyzing the request at 508 can include an analysis by a pilot (e.g., pilot 106a of FIG. 1). Instructions for transmission to the robot may be provided by the pilot via a pilot interface (e.g., pilot interface 108 of FIG. 1). Instructions for transmission to the robot may be assembled without pilot intervention.

At 512, the tele-operation system transmits instructions to the robot. The instructions to the robot can be based at least part on each respective relative likelihood, and can cause an increase in a level of autonomy of the robot. The instructions may include instructions for the robot to a) perform one or more of the candidate actions, b) exit a standby mode, c) identify auxiliary candidate actions, and/or d) pause, sleep, or shutdown. At 514, method 500 ends.

Throughout this specification and the appended claims the term "communicative" as in "communicative coupling" and in variants such as "communicatively coupled," is generally used to refer to any engineered arrangement for transferring and/or exchanging information. For example, a communicative coupling may be achieved through a variety of different media and/or forms of communicative pathways, including without limitation: electrically conductive pathways (e.g., electrically conductive wires, electrically conductive traces), magnetic pathways (e.g., magnetic media), wireless signal transfer (e.g., radio frequency antennae), and/or optical pathways (e.g., optical fiber). Exemplary communicative couplings include, but are not limited to: electrical couplings, magnetic couplings, radio frequency couplings, and/or optical couplings.

Throughout this specification and the appended claims, infinitive verb forms are often used. Examples include, without limitation: "to encode," "to provide," "to store," and the like. Unless the specific context requires otherwise, such infinitive verb forms are used in an open, inclusive sense, that is as "to, at least, encode," "to, at least, provide," "to, at least, store," and so on.

The various implementations described herein may include or be combined with the teachings of U.S. Provisional Patent Application Ser. No. 63/173,670, filed Apr. 12, 2021 and entitled "Systems, Devices, and Methods for Developing Robot Autonomy", which is incorporated herein by reference in its entirety.

This specification, including the drawings and the abstract, is not intended to be an exhaustive or limiting description of all implementations and embodiments of the present systems, devices, and methods. A person of skill in the art will appreciate that the various descriptions and drawings provided may be modified without departing from the spirit and scope of the disclosure. In particular, the teachings herein are not intended to be limited by or to the illustrative examples of computer systems and computing environments provided.

This specification provides various implementations and embodiments in the form of block diagrams, schematics, flowcharts, and examples. A person skilled in the art will understand that any function and/or operation within such block diagrams, schematics, flowcharts, or examples can be implemented, individually and/or collectively, by a wide range of hardware, software, and/or firmware. For example, the various embodiments disclosed herein, in whole or in part, can be equivalently implemented in one or more: application-specific integrated circuit(s) (i.e., ASICs); standard integrated circuit(s); computer program(s) executed by any number of computers (e.g., program(s) running on any number of computer systems); program(s) executed by any number of controllers (e.g., microcontrollers); and/or program(s) executed by any number of processors (e.g., microprocessors, central processing units, graphical processing units), as well as in firmware, and in any combination of the foregoing.

Throughout this specification and the appended claims, a "memory" or "storage medium" is a processor-readable medium that is an electronic, magnetic, optical, electromagnetic, infrared, semiconductor, or other physical device or means that contains or stores processor data, data objects, logic, processor instructions, and/or programs. When data, data objects, logic, processor instructions, and/or programs are implemented as software and stored in a memory or storage medium, such can be stored in any suitable processor-readable medium for use by any suitable processor-related instruction execution system, apparatus, or device, such as a computer-based system, processor-containing system, or other system that can fetch the data, data objects, logic, processor instructions, and/or programs from the memory or storage medium and perform various acts or manipulations (i.e., processing steps) thereon and/or in response thereto. Thus, a "non-transitory processor-readable storage medium" can be any element that stores the data, data objects, logic, processor instructions, and/or programs for use by or in connection with the instruction execution system, apparatus, and/or device. As specific non-limiting examples, the processor-readable medium can be: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and/or any other non-transitory medium.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

The invention claimed is:

1. A method of tele-operating a robot, the method performed by a tele-operation system, the tele-operation system communicatively coupled to the robot, the method comprising:
   initializing the robot;
   transmitting an objective to the robot;
   receiving, from the robot, a request for instructions, the request for instructions comprising a set of candidate actions that may be performed by the robot, and, for each candidate action of the set of candidate actions, a respective set of ancillary data;
   analyzing by a pilot each of at least a subset of candidate actions and each respective set of ancillary data to determine a respective relative likelihood that each candidate action in the at least a subset of candidate actions, if performed by the robot, will lead to furtherance of the objective; and
   transmitting instructions to the robot, based at least part on each respective relative likelihood, to increase a level of autonomy of the robot.

2. The method of claim 1, wherein the receiving, from the robot, a request for instructions includes receiving, from the robot, a set of candidate actions that may be performed by the robot in furtherance of the objective.

3. The method of claim 1, wherein the receiving, from the robot, a request for instructions includes receiving, from the robot, a request for instructions in response to the robot determining the robot is unable to select a candidate action of the set of candidate actions to perform.

4. The method claim 3, wherein the receiving, from the robot, a request for instructions includes receiving a respective score for each candidate action of the set of candidate actions, the respective score which includes a respective probability for each candidate action, the respective probability being based at least in part on an expectation of progress, achievable by each candidate action, towards an objective.

5. The method of claim 4, wherein the receiving, from the robot, a request for instructions further includes receiving an order of preference, the order of preference being based at least in part on the respective probability of each candidate action.

6. The method of claim 4, wherein analyzing by the pilot each of at least a subset of candidate actions and each respective set of ancillary data includes analyzing, by the pilot, the respective score of each candidate action in at least the subset of candidate actions to determine a respective relative likelihood that each candidate action in the at least a subset of candidate actions, if performed by the robot, will lead to furtherance of the objective.

7. The method of claim 6, further comprising updating at least one of a machine-learning model or a machine-learning process of the tele-operation system based at least in part on the respective score of each candidate action.

8. The method of claim 1, the robot being a semi-autonomous robot characterized by a level of autonomy, the level of autonomy being determined at least in part by the control model, wherein receiving, from the robot, a request for instructions includes receiving a request for instructions in response to the robot determining the level of autonomy of the robot is lower than a threshold level of autonomy, the threshold level of autonomy above which the robot is operable to autonomously select a candidate action of the set of candidate actions to perform.

9. The method of claim 1, wherein transmitting instructions to the robot, based at least part on each respective relative likelihood, to increase a level of autonomy of the robot includes transmitting instructions to the robot to cause the robot to update a control model.

10. The method of claim 9, wherein transmitting instructions to the robot to cause the robot to update a control model includes transmitting instructions to the robot to cause the robot to update at least one of control instructions, control data, or control parameters.

\* \* \* \* \*